J. G. GUEOVJIAN.
LENS.
APPLICATION FILED DEC. 10, 1910.
1,003,599.
Patented Sept. 19, 1911.
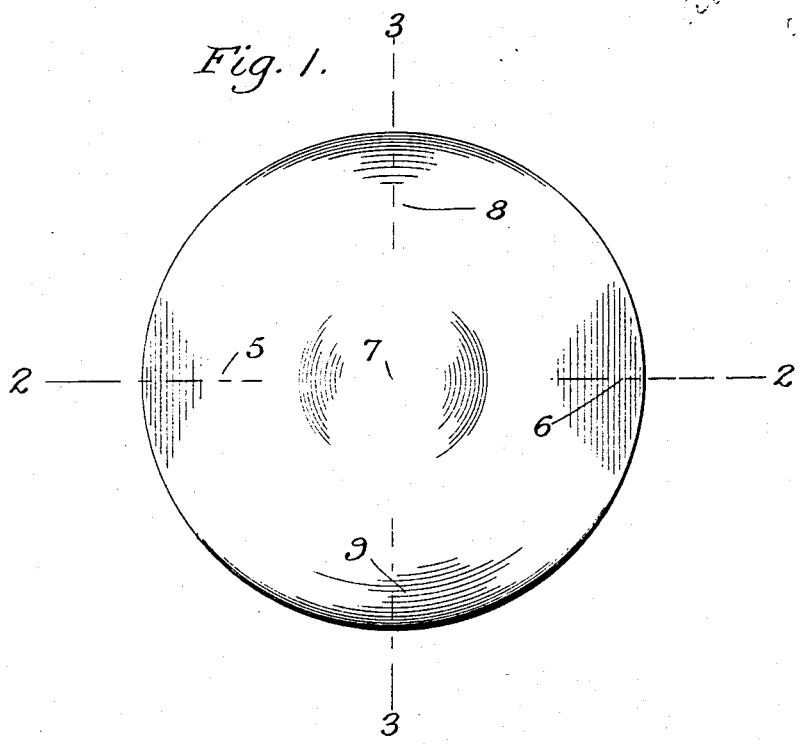

UNITED STATES PATENT OFFICE.

JOHN G. GUEOVJIAN, OF NEW YORK, N. Y.

LENS.

1,003,599.  Specification of Letters Patent.  Patented Sept. 19, 1911.

Application filed December 10, 1910. Serial No. 596,588.

*To all whom it may concern:*

Be it known that I, JOHN G. GUEOVJIAN, a subject of the Sultan of Turkey, and a resident of the city of New York, county of Westchester, and State of New York, have invented certain new and useful Improvements in Lenses, of which the following is a specification.

This invention relates to optical lenses, with more particular reference to lenses for photographic cameras, and has for its object the provision of a lens with a surface configuration which, instead of being symmetrical to preserve the proportionate direction of the rays of light projected therethrough, is varied from the normal to deflect the rays in a manner to produce a distorted image. This abnormal deflection of the rays is to produce an unnatural photograph of an object for amusement purposes, my lens so projecting the rays as to make a tall and slender subject appear as short and fat on the negative, or a short and corpulent subject appear as tall and slender on the negative, as the photographer may desire.

My invention will be more readily understood by reference to the accompanying drawings, forming a part of this specification, and in which—

Figure 1 is a plan view of a lens embodying my invention; Fig. 2 is a transverse section taken on the line 2—2 of Fig. 1, and Fig. 3 is a section taken on the line 3—3 of Fig. 1.

As will be noted from the drawings, my lens has the general appearance of any ordinary plano-convex optical or photographic lens, but instead of preserving symmetry and uniformity in the curvature of the convex surface, along one diameter the curve near each edge of the lens is flattened, as shown at 5 and 6, the curve of the convex surface along this line being substantially that of an hyperbola, the curvature at the apex 7, being more sharp and at the points 5 and 6 of a lesser degree than the curvature of a normal plano-convex lens at these points, as shown in Fig. 2. Furthermore, along the diametrical line of a section taken at right angles to that just referred to, as shown in Fig. 3, I increase the degree of curvature at the points 8 and 9 near the edges of the convex surface and make the curve at the crown or apex 7 more nearly flat. This curve may be said to be parabolic, with the curvature at the points 8 and 9 more sharp and at the apex 7 of a lesser degree than that of the normal plano-convex lens. The convex surface of the lens throughout the quadrant between the cross sections the curvature of which has just been described, merges symmetrically from the sharper to the flatter hyperbolic curve.

The lens which I have just described, when mounted in the position indicated in the drawings, will so deflect the rays of light directed against the same as to cause the same to diverge in vertical planes and to converge in horizontal planes, thus distorting the image projected on a screen or to the eye so that the vertical dimensions of the object are proportionately increased and the horizontal dimensions thereof proportionately decreased, in the manner hereinbefore suggested. By turning the lens through an arc of 90°, the conditions just described will be reversed, and the rays be caused to diverge in horizontal planes and converge in vertical planes, whereby the image will be proportionately reduced in vertical dimensions and proportionately increased in horizontal dimensions.

By the use of this lens, it will be apparent that ludicrously distorted photographic and optical effects may be produced for amusement and other purposes.

Having thus described my invention, I claim as new and desire to secure by Letters Patent:

1. An optical lens having a symmetrically distorted convex surface, the curve of said surface being flattened along one diameter near the ends thereof, substantially as and for the purpose specified.

2. An optical lens having a symmetrically distorted convex surface, the curve of said surface being sharpened along one diameter near the ends thereof, substantially as and for the purpose specified.

3. An optical lens of plano-convex configuration having the curvature of its convex surface flattened near the ends of one diameter thereof and sharpened near the ends of a diameter at right angles to said first-mentioned diameter, substantially as and for the purpose specified.

4. A plano-convex optical lens having a convex surface symmetrically distorted from the normal through the flattening of the curve of said surface near the ends of one diameter and the sharpening of the curves near the ends of a diameter at right angles to said first-mentioned diameter, said curves symmetrically merging into each other along the convex surface of said lens, substantially as and for the purpose specified.

In testimony of the foregoing, I have hereunto set my hand in the presence of two witnesses:

JOHN G. GUEOVJIAN.

Witnesses:
 AARON GINSBURG,
 P. FRANK SONNEK.